(12) United States Patent
Van Den Enden

(10) Patent No.: US 6,452,881 B1
(45) Date of Patent: Sep. 17, 2002

(54) SUSPENSION DESIGN INCLUDING SHAPED GIMBAL ARMS HAVING A REDUCED MASS PORTION ALONG A LENGTH THEREOF

(75) Inventor: Gijsbert J. Van Den Enden, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/300,695

(22) Filed: Apr. 27, 1999

(30) Foreign Application Priority Data

Apr. 28, 1998 (EP) .............................................. 98201370

(51) Int. Cl.[7] .............................................. G11B 7/005
(52) U.S. Cl. .................... 369/47.35; 369/47.35; 369/53.34; 369/59.21
(58) Field of Search .......................... 369/47.35, 53.34, 369/59.21; 360/51, 65, 32

(56) References Cited

U.S. PATENT DOCUMENTS 5,569,912 A    10/1996  Turk et al.
5,905,601 A *   5/1999  Tsunoda
6,108,154 A *   8/2000  Van Den Enden

FOREIGN PATENT DOCUMENTS

WO    WO98149683    11/1998

* cited by examiner

Primary Examiner—W. R. Young
(74) Attorney, Agent, or Firm—Michael E. Belk

(57) ABSTRACT

Apparatus for reproducing information from a record carrier include a read head for reading marks representing the information, from a track on the disc shaped record carrier so as to provide an analog read signal. An A/D converter converts the analog read signal to a digital read signal with a specific clock frequency, in response to a control signal. A bit recovery unit retrieves a sequence of bits from the digital read signal, with a specific bit frequency. A generator unit derives the control signal, and includes a generator for deriving the specific bit frequency, and a velocity deriving unit for deriving from the digital read signal, the control signal which indicates the relative velocity of the read head with respect to the marks, so as to generate the specific clock frequency such that approximately N samples per bit are supplied by the A/D converter, irrespective of the relative velocity of the read head with respect to the marks.

14 Claims, 5 Drawing Sheets

US 6,452,881 B1

SUSPENSION DESIGN INCLUDING SHAPED GIMBAL ARMS HAVING A REDUCED MASS PORTION ALONG A LENGTH THEREOF

The invention relates to an apparatus for reproducing information from a record carrier. Such apparatuses are well known in the art. Reference is made in this respect to U.S. Pat. No. 5,569,912, document D1 in the list of related documents that can be found at the end of this description.

BACKGROUND OF THE INVENTION

Field of the Invention

The invention relates to the field of record carrier reading and writing control.

The apparatus defined above may be for reading an optical disc, such as the CD or DVD, or may be for reading and writing a writable record carrier. In such an apparatus a reading head generates a read signal from a track on the record carrier, whilst the head is moving relative to the track with a specific velocity. The record carrier is designed to be rotated during reproduction with a nominal rate inversely proportional to the radial position of the read head, so that an information signal with a substantially constant bitrate can be recovered from a record carrier recorded with a constant density. When information is to be retrieved from different parts of the disc the reading head is moved radially at high speed, called a jump, and the rotation rate has to be changed correspondingly to achieve the specific velocity. The changing of the rotation rate causes delays and requires a strong motor.

The above citations are hereby incorporated herein in whole by reference.

SUMMARY OF THE INVENTION

The invention aims at providing a reproducing apparatus which is more versatile and is capable of reading information from the record carrier at various speeds.

In accordance with the invention, the apparatus for reproducing information from a record carrier includes reading apparatus for reading marks from the track, the reading apparatus including a read head for generating a read signal from the track, A/D conversion apparatus for A/D converting the read signal with a specific clock frequency, in response to a first control signal, bit detector apparatus having an input coupled to the A/D conversion apparatus, which bit detector apparatus is adapted to retrieve a sequence of bits from the signal applied to its input, with a specific bit frequency, and apparatus for deriving the specific bit frequency, output apparatus for supplying the sequence of bits, deriving apparatus for deriving the first control signal, and is characterized in that the deriving apparatus includes apparatus means for deriving from the read signal a second control signal which is indicative of the relative velocity of the read head with reference to the marks, and apparatus for outputting the first control signal in dependence of the second control signal.

The invention has the effect that the A/D converter and further digital elements, such as an equalizer and bit detector apparatus, operate with a substantially fixed ratio between the specific clock frequency and the bit frequency. It is advantageous, that the first control signal is derived from a speed dependent parameter of the read signal itself, as the parameter in the read signal corresponds to the actual speed of the read head with respect to the recorded marks. This results in a reliable recovery of the bit frequency over a wide range of speeds, allowing a fast start of the data recovery following a jump.

In addition the invention is advantageous in that the rotation rate may be adapted more slowly, which results is less strict requirements on the drive motor and the power consumption due to accelerating and braking the disc. When jumps are performed with short intervals the apparatus operates effectively with a substantially constant rate of rotation (Constant Angular Velocity, CAV), whereas when relatively large amounts of date are read the apparatus operates with a substantially constant linear velocity (CLV) of the head relative to the track, because the speed of rotation is slowly changed according to the CLV speed range, i.e. inversely proportional to the radial position of the read head. This has the advantage, that the apparatus adapts itself to the type of application, i.e. having a short access time for applications with many random jumps and having a constant specific bit frequency when reproducing large amounts of information.

A preferred embodiment is characterized in that the deriving apparatus further includes apparatus for deriving a third control signal which has a relationship with the bit frequency, and in that the apparatus for outputting the first control signal are arranged for outputting the first control signal in dependence of the second control signal and the third control signal. This results in that the ratio is controlled to be substantially a value N. This is provided by two control loops, one coarse control loop and a fine control loop. The coarse control loop generates the second control signal and controls the specific clock frequency in such a way that the A/D converter supplies a substantially fixed number of N samples per bit to be detected, irrespective of the relative velocity of the read head with reference to the track. The fine control loop generates the third control signal and controls the specific clock frequency so as to correct for the deviation of the specific clock frequency, expressed in number of samples per bit, from the value of N samples per bit.

As a result, although the apparatus for deriving the specific bit frequency may have a small capture range, the apparatus will very quickly control towards the N samples per bit situation.

BRIEF DESCRIPTION OF THE DRAWINGS

Those skilled in the art will understand the invention and additional objects and advantages of the invention by studying the description of preferred embodiments below with reference to the following drawings which illustrate the features of the appended claims:

DETAILED DESCRIPTION OF THE PREFERRED EMBODIMENTS

Figure 1:
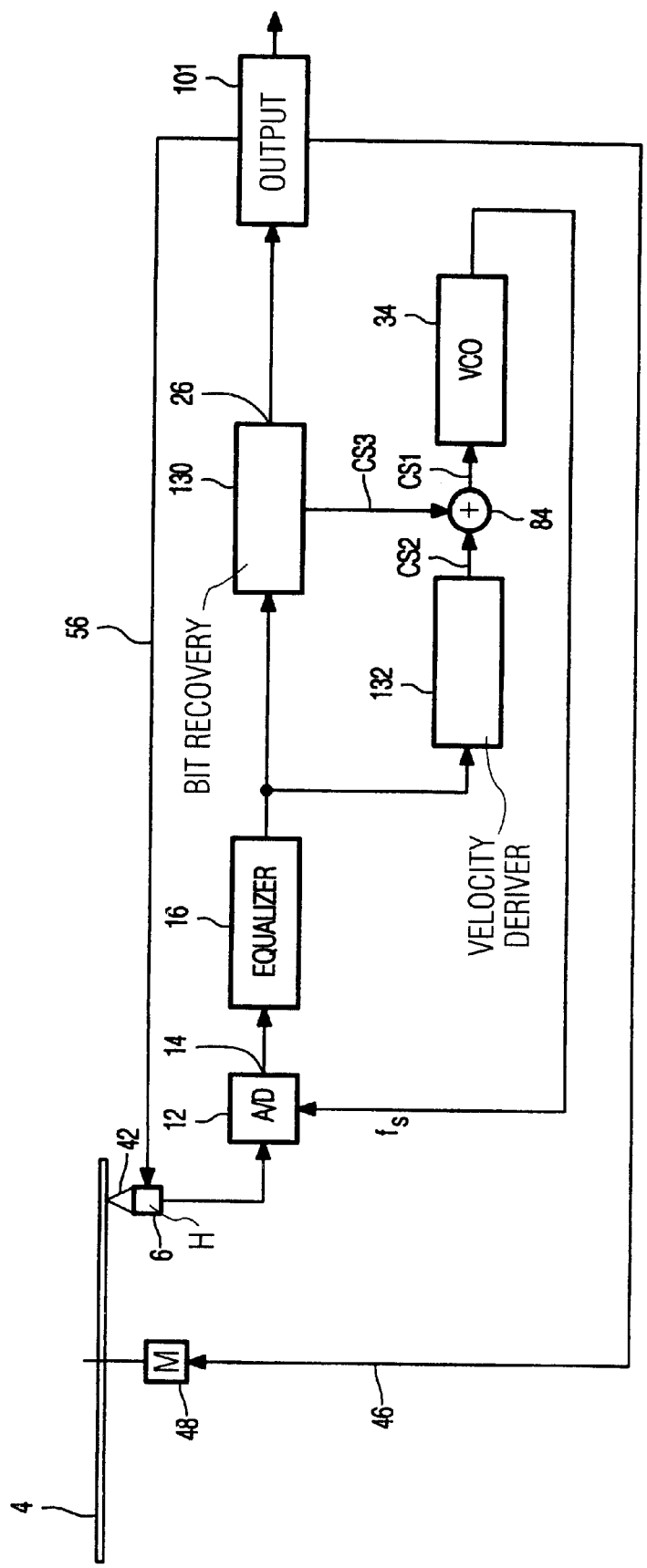
FIGS. 1 and 2 show an embodiments of the apparatus.

FIG. 1 shows an embodiment of the reproducing apparatus in accordance with the invention, The apparatus includes a read head 6 for reading the information from a record carrier 4 via a radiation beam 42, such as a laser beam guided via an optical system and the marks in the track to a detector. An output of the read head 6 is coupled to an input of an A/D converter 12, which has an output 14. The A/D converter 12 samples the information read from a track on the record carrier 4 with a specific clock frequency (or sampling frequency) $f_s$ and supplies samples of the information signal with the specific clock frequency at its output 14. The record carrier 4 is rotated by a motor 48, which is controlled via a rotation control signal 46.

The apparatus is generally provided with an equalizer unit 16. The equalizer unit 16 is however not strictly necessary for explaining the invention, so could be left out or substituted by other digital signal processing apparatus for recovering the information signal. An input of the equalizer unit 16 is coupled to the output 14 of the A/D converter 12 and an output of the equalizer unit 16 is coupled to an input of a bit recovery unit 130. The bit recovery unit 130 includes a generator circuit for generating the bit frequency $f_b$, such as a PLL and a bit detector unit. The bit detector unit is changed to retrieve a sequence of bits from the input signal, with a specific bit frequency $f_b$. An output 26 of the bit recovery unit 130 is coupled to an output unit 101, which controls the output of data. Data may be requested by an external device or may be given out at a predetermined rate. Output unit 101 controls the rotation rate of the motor 48 via the rotation control signal 46 and the position of the read head via a control signal 56 such that the requested amount of data is retrieved. When no data is required the read head may be controlled to jump back one or more tracks.

The apparatus further includes velocity deriving apparatus 132 for deriving from the information signal read from the record carrier a second control signal cs2 which is indicative of the relative velocity of the read head with reference to marks on the record carrier 4 representing the information signal. The velocity may be derived from certain frequency components in the spectrum of the read signal. For a record carrier on which the marks include marks of different lengths, the velocity deriving means 132 are arranged for deriving the second control signal (cs2) depending on the average length of signal portions in the information signal corresponding to the marks. For example, in the well known CD, a channel code called EFM is used, having marks of a runlength of 3 to 11, and an average runlength of 5. A similar channel code is used for DVD. The average runlength is a suitable indicator of the velocity. Alternatively the shortest and/or the longest marks may be identified in the read signal, and the respective lengths or their difference may be used as an indicator of the velocity. The second control signal cs2 is converted to control signal cs1 and coupled to a $f_s$ generator 34, which may be a Voltage Controlled Oscillator (VCO), for generating the specific clock frequency $f_s$. The control signal cs2 may be combined with a third control signal cs3 supplied by the bit recovery unit 130 via a combination unit 84 for outputting the first control signal. The third control signal cs3 indicates the deviation of the number of samples per bit from a target value of number of samples per bit.

Figure 2:
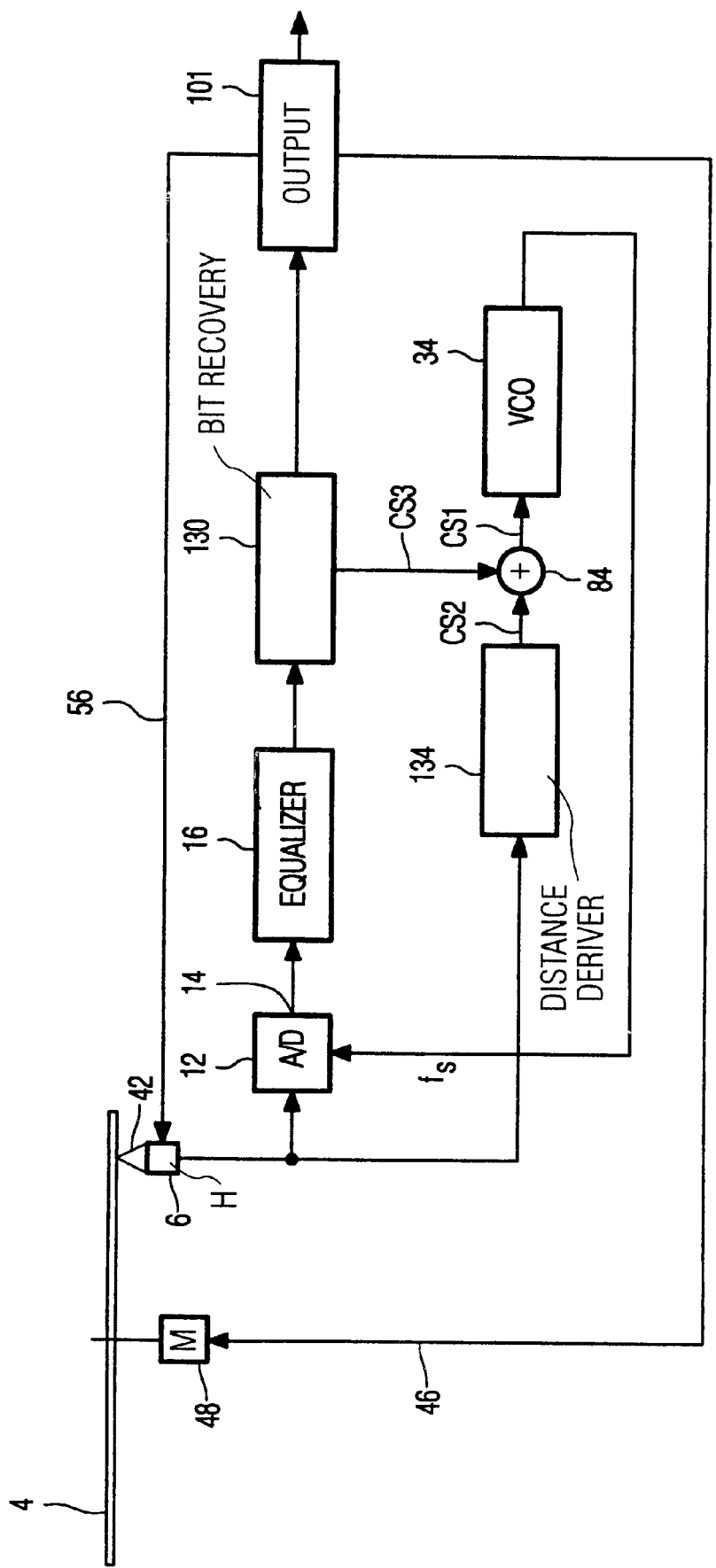

FIG. 2 shows a further embodiment of the reproducing apparatus in accordance with the invention. Like the embodiment described above with reference to FIG. 1 the apparatus includes a motor 48, a read head 6, an A/D converter 12, a bit recovery unit 130, an output unit 101, a $f_s$ generator 34 and optionally an equalizer unit 16 and/or a combination unit 84. The apparatus further includes distance deriving apparatus 134, as a further embodiment of the velocity deriving apparatus, for deriving from the read signal from the record carrier a second control signal cs2 which is indicative of the relative velocity of the read head with reference to servo marks in the track on the record carrier 4. Servo marks are detected in the read signal itself or derived from the read head via a different combination of detector signals, such as from a quadrant detector commonly used for deriving servo signals. The detection signal or servo signals are coupled to the input of the distance deriving apparatus, either in analog form or after digitalization. From the servo signals the time interval between servo marks is determined by the distance deriving apparatus 134. A velocity value is based on the known distance of servo marks on the respective type of record carrier and the measured time interval, and the velocity value is converted into control signal cs2. The control signal cs2 is outputted to the combination apparatus 84 to be converted into control signal cs1. The velocity value may be averaged to prevent sudden fluctuations of the control signals. The type of servo marks is dependent on the respective record carrier. The servo marks may be radial variations of the track position, usually called wobble, and/or headers and/or pre-pits and/or fine clock marks at a predetermined distance between the marks. Track wobble is commonly used in CD-R, in particular a modulation of the wobble is used to indicate address information. Headers are commonly used in discs for data storage, for example in DVD-RAM, in which the distance between headers is a predetermined number of bits. Pre-pits are used for servo control or header on writable discs, such as DVD-R, and also have a predetermined distance. Fine clock marks are a specific type of track variation used in combination with wobble, and having a significant different shape than the wobble, e.g. the fine clock marks have a relatively high spatial frequency whereas the other wobbles have a relatively low spatial frequency. In this case the distance deriving apparatus 134 have wobble detection apparatus and apparatus for Detecting the different shape of the fine clock marks. The number of bits between servo marks may also be dependent on the radial position on the disc. The actual number of bits is then calculated based on a radial position indicator, such as on a track number or a zone number, which may be retrieved from the headers or the modulated wobble. The distance deriving apparatus are arranged for deriving the second control signal (cs2) depending on parameters of the servo signals corresponding to the marks indicating the distance.

Figure 3:
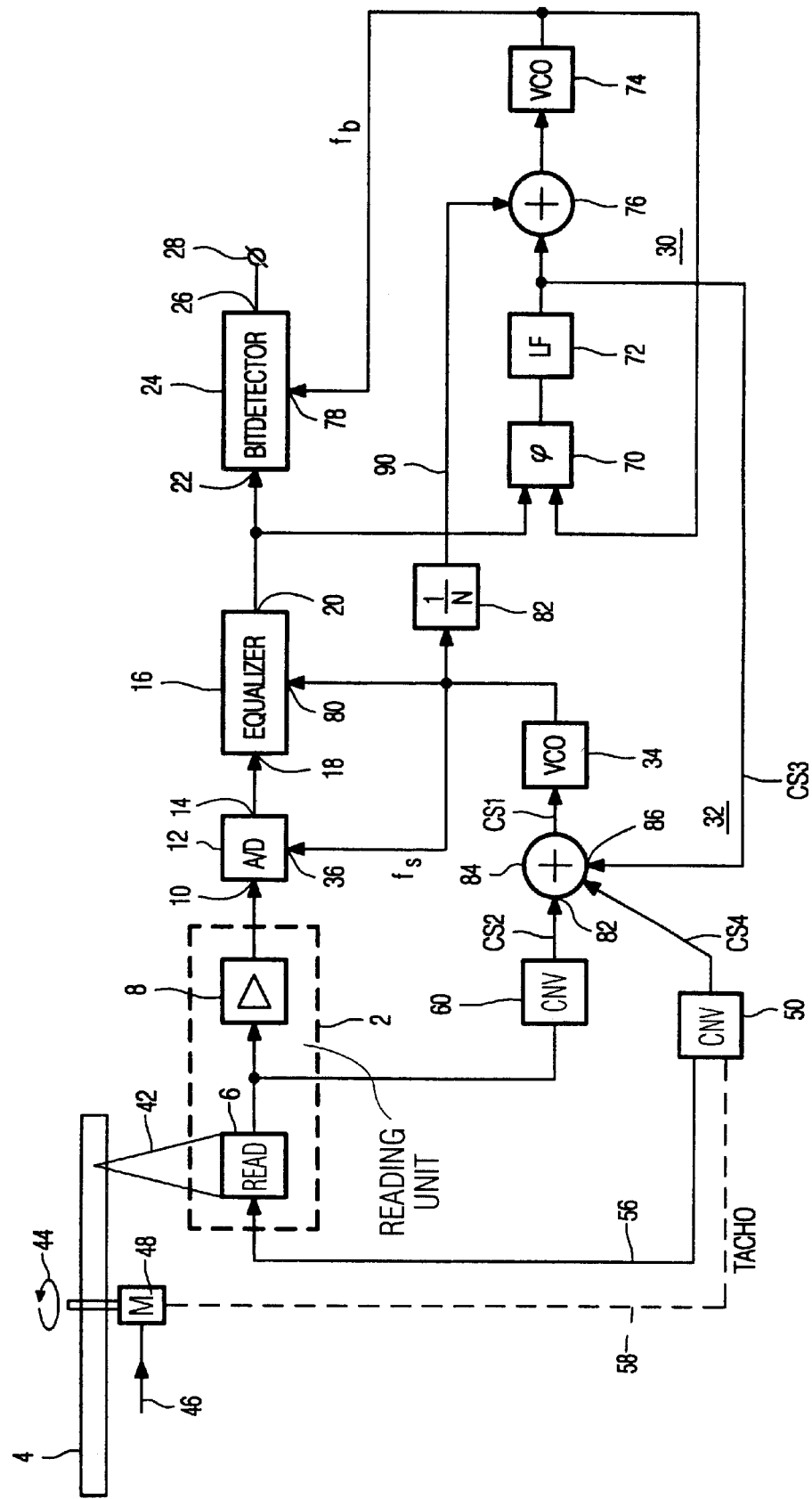
FIG. 3 shows an embodiment of the apparatus in more detail.

FIG. 3 shows a detailed embodiment of the reproducing apparatus in accordance with the invention. The apparatus includes a reading unit 2 for reading the information from a record carrier 4. The reading unit includes at least one read head 6 and generally also a pre amplifier 8. An output of the reading unit 2 is coupled to an input 10 of an A/D converter 12, which has an output 14. The A/D converter 12 samples the information read from a track on the record carrier 4 with a specific clock frequency (or sampling) $f_s$ and supplies samples of the information signal with the specific clock frequency at its output 14.

The apparatus is generally provided with an equalizer unit 16. The equalizer unit 16 is however not strictly necessary for explaining the invention, so could be left out or substituted by other digital signal processing apparatus for recovering the information signal. An input 18 of the equalizer unit 16 is coupled to the output 14 of the A/D converter 12 and an output of the equalizer unit 16 is coupled to an input 22 of a bit detector unit 24. An output 26 of the bit detector unit 24 is coupled to an output terminal 28.

The bit detector unit 24 is changed to retrieve a sequence of bits from the signal applied to its input 22, with a specific bit frequency $f_b$.

The apparatus further includes a generator circuit 30 for generating the bit frequency $f_b$ and a generator circuit 32 for generating the clock frequency $f_s$. The generator circuit 38 is a phase locked loop and includes a phase comparator 70, a loop filter 72 and a voltage controlled oscillator 74. A first input of the phase comparator 70 is coupled to the output of the equalizer unit 16 and a second input of the phase comparator 70 is coupled to the output of the oscillator 74. An output of the phase comparator 70 is coupled to an input of the loop filter 72, which has an output coupled, via a signal combination unit 76 to an input of the oscillator 74. The output of the oscillator 74 is further coupled to a clock input of the bit detector 24 to provide clock frequency $f_b$.

It should be noted that the generator circuits 30 and 32 function such that they generate frequencies $f_b$ and $f_s$ respectively, such that $f_s/f_b=N$, where N is a constant, not necessarily an integer constant, irrespective of the relative speed of the head 6 with reference to the track on the record carrier which is read out.

The value N stands for the number of samples per bit, to be detected by the bit detector unit 24, and generated by the A/D converter 12.

The A/D converter 12 converts the information signal read from the record carrier with the specific clock frequency $f_s$, in response to a first control signal cs1. In the present embodiment, this clock signal is generated by a voltage controlled oscillator 34, which is part of the loop 32 and supplies the clock frequency $f_s$ to a clock input 36 of the A/D converter 12. The clock frequency $f_s$ is also supplied to a clock input 80 of the equalizer unit 16 and to a converter 82. The converter 82 is in the form of a frequency divider and divides the frequency $f_s$ supplied to its input by N and supplies a frequency $f_s/N$ to its output. This output is coupled to another input of the signal combination unit 76.

Figure 4:
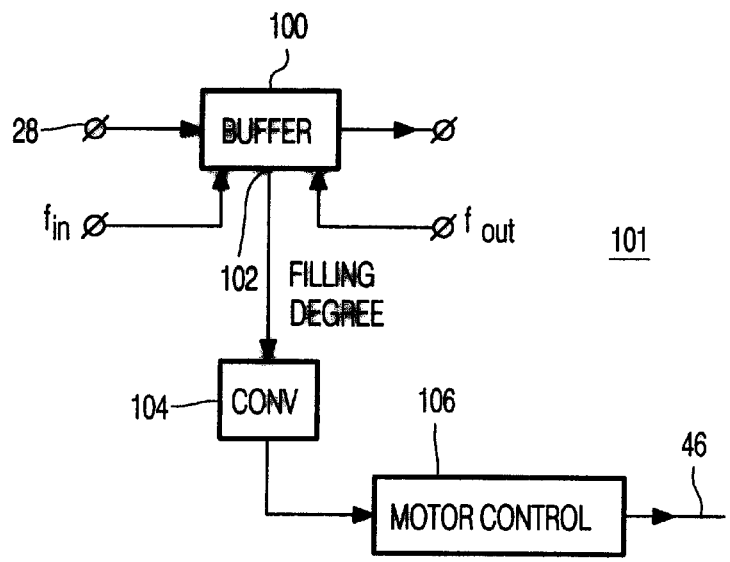
FIG. 4 shows the addition of an output buffer to the apparatus of FIG. 3.

A drive motor 48 is provided for rotating the disc-shaped record carrier 4 in a direction indicated by the arrow 44. The motor is controlled by a control signal 46. The control signal 46 may be derived from the signal read by the read head based on information marks or servo marks on the record carrier. The control signal 46 may alternatively be based on the amount of data required, e.g. derived from a data buffer system as shown in FIG. 4. The read head is positioned in radial direction by a radial control signal 56 generated in customary way.

The apparatus is provided with a converter 60, which generates a second control signal cs2 in response to a parameter of the read signal. The second control signal cs2 is a measure of the relative velocity of the read head 6 with reference to the marks representing the information signal or servo information indicative of the position of the track on the disk, as described with reference to FIGS. 1 and 2. The second control signal cs2 is supplied to an input 82 of a signal combination unit 84. Via a second input 86 of the combination unit 84, a third control signal cs3 is supplied. This third control signal cs3 is the output signal of the loop filter 72 in the PLL 30. The apparatus may be further provided with converter apparatus 50 for deriving a fourth control signal (cs4), which is connected to the combination unit 84. The motor 48 may be provided with a tacho generator which supplies tacho pulses via the line 58 towards the converter 50. The convertor 50 also receives the position control signal 56, and converts the radial position and the rotation rate into a value of the fourth control signal (cs4) which is a measure of a nominal relative velocity of the read head with reference to the record carrier at the rotation rate and radial position. The nominal velocity may be calculated from the actual measured rotation rate and radial position, or may be set to a target value in the event of a jump to a different part of the track, the target value being based on the radial position and/or rotation rate on arrival. The combination unit (84) is arranged for outputting the first control signal cs1 and is also dependent on the fourth control signal cs4, e.g. by adding the signal to the second control signal (cs2).

Alternatively combination unit 84 may be arranged for coupling the fourth control signal instead of the second control signal depending on a condition of the apparatus, such as in a period when no information signal is available from the read head or when the read head is moved radially across the tracks for accessing a different part of the track.

The functioning of the apparatus will now be described in greater detail. It is assumed that the record carrier is driven at a specific rotation rate and radial position, resulting in a linear speed $v_1$. As a result, servo mark pulses are detected and supplied to the converter 60, which generates a second control signal cs2 in response thereto. The second control signal cs2 is supplied to the oscillator 34 via combination unit 84 and results in the generation of a clock frequency $f_s$, which is supplied to the A/D converter 12. In response thereto, the A/D converter 12 samples the information signal read from the record carrier such that roughly N samples per bit to be detected are generated. When the record carrier linear speed changes, either increases or decreases, the frequency of the servo pulses generated increases or decreases. As a result, the clock frequency $f_s$ increases or decreases. With an increased (decreased) record carrier speed, however, the information signal is read out with an increased (decreased) speed and this information signal is sampled with an increased (decreased) clock frequency $f_s$, so that, in the end, again roughly N samples per bit to be detected are generated by the A/D converter 12, irrespective of the record carrier speed.

The control loop, formed by the elements 48, 60, and 34, thus constitutes a coarse control loop, such that at the output of the A/D converter 12, roughly a fixed number (N) of samples per bit to be detected is generated. N could, as an example be chosen equal to 3.

Figure 6:
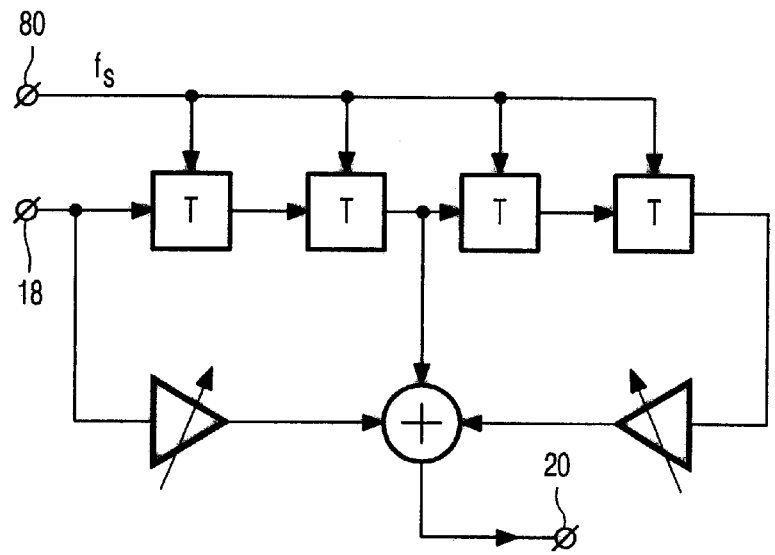
FIG. 6 shows an embodiment of the equalizer unit in the apparatus of FIG. 1, 2 or 3
Figure 7:
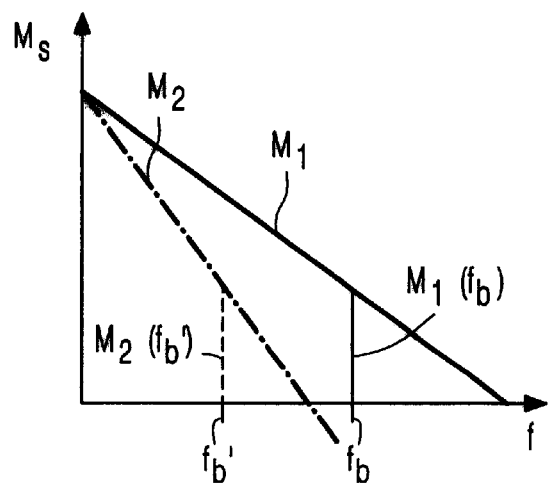
FIG. 7 shows the magnitude characteristic as a function of frequency of the information signal read from the record carrier, for two different speeds of the record carrier during reproduction.
Figure 8:
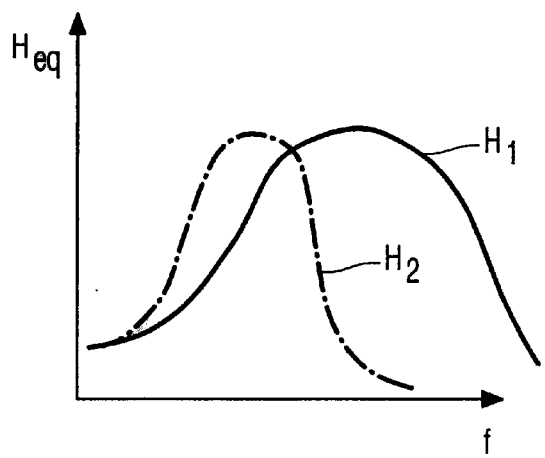
FIG. 8 shows the filter curve of the equalizer unit as a function of frequency, for the same two different speeds of the record carrier.

The equalizer unit 16 also receives the clock frequency $f_s$. FIG. 6 shows an example of an embodiment of the equalizer unit 16, FIG. 7 shows an example of the magnitude characteristic $M_1$ as a function of frequency, of the information signal read from the record carrier at the specific speed $v_1$ and FIG. 8 shows by the curve $H_1$ the frequency characteristic of the equalizer unit 16 at the specific record carrier speed $v_1$. The magnitude characteristic $M_1$ has a certain magnitude $M_1(f_b)$ at the bit frequency $f_b$.

The delay elements denoted T in the equalizer unit of FIG. 6 are controlled by the clock frequency $f_s$ and provide a delay T which equals $1/f_s$. With this delay, the equalizer unit 16 of FIG. 4 provides the frequency characteristic $H_1$ in FIG. 8.

When changing the record carrier speed, such as decreasing the speed by a factor of 2, the magnitude characteristic of the signal read from the record carrier scales down by a factor of 2, so that it changes into the characteristic $M_2$ shown in FIG. 7. The magnitude $M_2(f_b')$ at the new bit frequency $f_b'$, is equal to $M_1(f_b)$. Because of the control loop formed by the elements 48, 60 and 34, the clock frequency $f_s$ is changed (decreased) with the same ratio of 2. As a result, the delays in the equalizer unit of FIG. 6 change, in the sense that their delay increases by this same factor of 2. This results in the frequency characteristic $H_2$ in FIG. 8. This characteristic $H_2$ has thus been scaled down to the same extent as the magnitude characteristic $M_2$ of the information signal read from the record carrier.

The functioning of the equalizer unit 16 is thus such that, again irrespective of the record carrier speed, the equalizer unit 16 correctly equalizes the signal read from the record carrier, under the control of the clock frequency $f_s$ generated by the oscillator 34.

The converter unit 82 generates a control signal at its output which is supplied via the combination unit 76 to the oscillator 74 so as to position the oscillator unit 74 at the frequency $f_s/N$.

Figure 9:
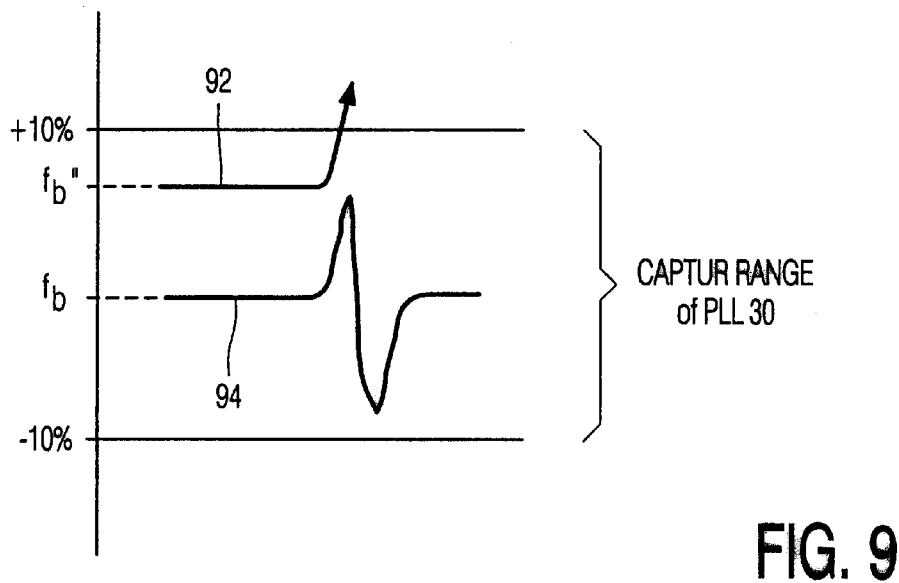
FIG. 9 shows the capture range of the phase locked loop in the apparatus of FIG. 3.

It should be noted that the PLL 30 controls the frequency of the oscillator 74 towards $f_b$. The PLL 30, however, has a small capture range of, eg. 10% smaller or larger than $f_b$, see FIG. 9. Using the control signal, applied via the line 90 and the signal combination unit 76 to the VCO 74, this VCO 74 is quickly brought into the vicinity of $f_b$, such as indicated by the line 92 in FIG. 9. Without the fine control, using the control signal cs3, to be described later, the VCO 74 will maintain the frequency value $f_b''$ and a disturbance, eg. caused by a variation in the speed of the record carrier will bring the frequency out of the capture range of the loop 30, as shown by the curve 92 in FIG. 9, so that the PLL 30 is out of lock.

The phase comparator 70 and loop filter 72, however, generate a control signal cs3, which is a measure of the deviation of the frequency of the VCO 74 from the required bit frequency $f_b$. It should be noted here, that the required bit frequency $f_b$ is not a fixed frequency value, but varies with varying record carrier speed.

This control signal cs3 is supplied to the second input 86 of the signal combination unit 84. This control signal cs3 is a fine control signal and controls the frequency of the VCO 74 towards the required bit frequency $f_b$. This is shown by the line 94 in FIG. 9. A disturbance, eg. caused by a variation in the speed of the record carrier, will result in a variation in the frequency of the VCO 74. This variation however is kept within the capture range of the loop 30, as shown by the curve 94 in FIG. 9, so that the PLL 30 remains in a locked situation.

FIG. 4 shows a buffer memory 100 that can be coupled to the output terminal 28 of the apparatus of FIG. 3. The buffer memory 100 functions as a FIFO memory. The sequence of bits detected by the bit detector 24 can be stored in the buffer memory with a specific frequency $f_{in}$, which will equal the frequency $f_b$, generated by the oscillator 74.

The detected bits can be retrieved from the buffer memory 100 using a read out clock frequency $f_{out}$. This frequency $f_{out}$ can be smaller or larger than $f_{in}$. In the former case, the buffer memory 100 will gradually be filled with information, resulting in an overflow. In the latter case, the buffer will gradually be emptied, until no bits are available anymore for supply with the required rate of $f_{out}$. In order to overcome these problems, the buffer memory 100 is provided with an output 102, at which output 102 a signal is available which is indicative of the filling degree of the buffer memory 100. This signal is converted into a control signal in a converter 104, and supplied to a motor control unit 106. The motor control unit 106 supplies drive signal 46 to the motors 48.

When $f_{out}$ is larger than $f_{in}$, the filling degree decreases. As a result, a control signal is generated such that the transport speed of the record carrier 4 is increased. When $f_{out}$ is smaller than $f_{in}$, the filling degree increases. As a result, a control signal is generated such that the transport speed of the record carrier 4 is decreased. The coarse control loop via the elements 60, 82 and 34 as well as the fin[0085] control loop 30, via the elements 70, 72, 82 and 34 adapts itself automatically to the varying transport speed of the record carrier, as explained above.

Figure 5:
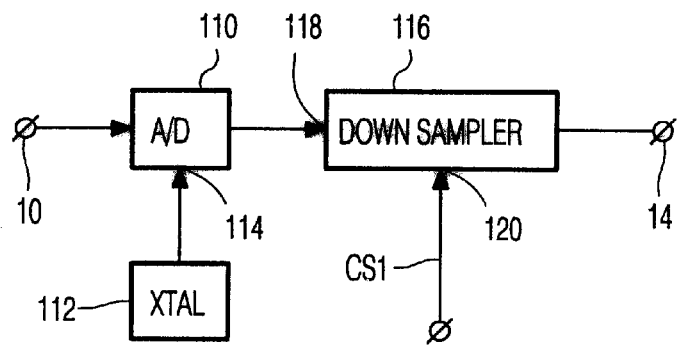
FIG. 5 shows another embodiment of the A/D converter in the apparatus of FIG. 1, 2 or 3

FIG. 5 shows another embodiment of the A/D converter unit 12 of FIG. 1, 2 or 3. The A/D converter unit of FIG. 5 includes an A/D converter 110, which receives a sampling frequency generated by an oscillator 112 via a clock input 114. The sampling frequency generated by the oscillator 112 can be higher than $f_s$. The samples generated by the converter 110 are supplied to a down sampler, which down samples the signal supplied to its input 118 in response to the first control signal cs1, applied to a control signal input 120. At its output 14, the information signal, sampled at the frequency $f_s$ will be available.

It should be noted that the down sampler 116 can not only down sample the array of samples applied to its input 118, but can also, if required, carry out an interpolation, so as to obtain its output signal.

Whilst the invention has been described with reference to preferred embodiments thereof, it is to be understood that these are not limitative examples. Thus, various modifications may become apparent to those skilled in the art, without departing from the scope of the invention, as defined by the claims. As an example, the control signal cs2 may be derived from synchronization patterns recorded on the record carrier. Further, in an alternative embodiment, the third control signal cs3 could be generated in a way different from the way described above, namely, from the output 102 of the buffer memory 100. In this alternative embodiment, $f_{out}$ is eg. derived from the element 82, see FIG. 1, and equals $f_s/N$. The control signal present at the output 102 of the buffer memory 100 is now a measure of the integral of $f_b-f_s/N$, and therefore a measure of the integral of the control signal $cs_3$. Further, the record carrier may be a longitudinal record carrier, rectangular card-shaped or a disk type record carrier, of the magnetic, magneto-optical or the optical type.

Further, the invention lies in each and every novel feature or combination of features.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

I claim:

1. Apparatus comprising:
   reading means for reading marks from a track on a record carrier, including a read head, for generating a read signal from the track;
   A/D conversion means for converting the read signal from an analog read signal to a digital read signal, with a specific clock frequency, depending on a first control signal;
   bit frequency means for deriving a specific bit frequency for the digital read signal and providing a bit frequency signal;

bit detector means to retrieve a sequence of bits from the digital read signal depending on the bit frequency signal;

output means for supplying the sequence of bits; and deriving means for deriving the first control signal, including:

second control signal means for deriving from the read signal a second control signal that indicates the velocity of the read head relative to the marks; and first control signal means for producing the first control signal depending on the second control signal.

2. The apparatus of claim 1, wherein the deriving means further include third control signal means for deriving a third control signal depending on the bit frequency, and wherein the first control signal means are for producing the first control signal depending on the second control signal and the third control signal.

3. The apparatus of claim 1, in which: the reading means are for reading marks of different lengths; and the second control signal means are for deriving the second control signal depending on the average length of signal portions in the read signal corresponding to the marks.

4. The apparatus of claim 1, in which: the reading means are for reading servo marks indicative of a position of the read head relative to the record carrier or to the track; and the second control signal means are for deriving the second control signal depending on signal portions in the read signal corresponding to the servo marks.

5. The apparatus of claim 4, in which: the servo marks are selected from the group consisting of pre-pits, fine clock marks, and combinations thereof; and the second control signal means are for deriving the second control signal depending on signal portions in the read signal corresponding to the distance.

6. The apparatus of claim 5, in which: the reading means are for reading information from a disc-shaped record carrier; and the second control signal means include means for calculating the predetermined distance depending on an indicator of a radial position of the read head derived from the read signal.

7. The apparatus of claim 1, in which:

the reading means are for reading information from a disc-shaped record carrier;

the deriving means further include means for deriving a fourth control signal based on a rotation rate of the disc and a radial position of the read head, which fourth control signal depends on a nominal relative velocity of the read head with respect to the record carrier at the rotation rate and radial position; and the first control signal means are for producing the first control signal depending both the second and fourth control signals.

8. The apparatus of claim 1, in which the bit frequency means include voltage controlled oscillator means for generating the specific clock frequency in response to the first control signal.

9. The apparatus of claim 1, in which the A/D conversion means further includes down-sampler means for generating sample values at the specific clock frequency in response to the first control signal.

10. The apparatus of claim 1, in which the apparatus further comprise digital equalizer filter means for equalizing the digital read signal so as to obtain an equalized information signal, with the specific clock frequency.

11. The apparatus of claim 1, in which the first control signal means produce the first control signal such that the specific clock frequency and the bit frequency are in a substantially fixed ratio N, where N has a positive constant value.

12. The apparatus of claim 11, in which the deriving means includes: coarse control signal generator means for deriving a coarse control signal so as to generate such specific clock frequency that roughly N samples per bit are supplied by the A/D conversion means, irrespective of the relative velocity of the read head with respect to the track; and fine control signal generator means for deriving a fine control signal so as to correct for the deviation of the specific clock frequency, expressed as a number of samples per bit, from the value of N.

13. The apparatus of claim 1, in which:

the deriving means include third control signal means for deriving a third control signal which has a predetermined relationship with the bit frequency;

the first control signal means are for deriving the first control signal depending on the second control signal and the third control signal;

the reading means are for reading marks of different lengths;

the second control signal means are for deriving the second control signal depending on the average length of signal portions in the read signal corresponding to the marks;

the reading means are for reading servo marks indicating a position of the read head relative to the record carrier or to the track;

the second control signal means are for deriving the second control signal depending on signal portions in the read signal corresponding to the servo marks;

the servo marks are selected from the group consisting of pre-pits, fine clock marks and combinations thereof;

the second control signal means are for deriving the second control signal depending on signal portions in the read signal corresponding to the distance;

the reading means are for reading information from a disc-shaped record carrier;

the deriving means include means for calculating the predetermined distance depending on an indicator of a radial position of the read head derived from the read signal;

the indicator of the radial position is a track number derived from the read signal;

the read means are for reading information from a disc-shaped record carrier;

the deriving means include means for deriving a fourth control signal based on a rotation rate of the disc and a radial position of the read head, which fourth control signal depends on a nominal relative velocity of the read head with respect to the record carrier at the rotation rate and radial position;

the first control signal means are for producing the first control signal depending both the second and fourth control signals depending on a condition of the apparatus;

the condition of the apparatus is a period when no read signal is available from the read head or when the read head is moved radially across the tracks for accessing a different part of the track;

the bit frequency means include voltage controlled oscillator means for generating the specific clock frequency in response to the first control signal;

the A/D conversion means further includes down-sampler means for generating sample values at the specific clock frequency in response to the first control signal;

the apparatus further comprise digital equalizer filter means for equalizing the digital read signal so as to obtain an equalized information signal, with the specific clock frequency;

the first control signal means are for producing the first control signal such that the specific clock frequency and the bit frequency are in a substantially fixed ratio N, where N has a positive constant value; and the deriving means includes:

coarse control signal generator means for deriving a coarse control signal so as to generate such specific clock frequency that roughly N samples per bit are supplied by the A/D conversion means, irrespective of the relative velocity of the at least one read head with reference to the track; and fine control signal generator means for deriving a fine control signal so as to correct for the deviation of the specific clock frequency, expressed as a number of samples per bit, from the value of N.

14. Apparatus comprising:

reading means for reading marks from a track on a record carrier including a read head, for generating a read signal from the track;

A/D conversion means for converting the read signal from an analog read signal to a digital read signal, with a specific clock frequency, depending on a first control signal;

bit frequency means for deriving a specific bit frequency for the digital read signal and providing a bit frequency signal;

bit detector means to retrieve a sequence of bits from the digital read signal depending on the bit frequency signal;

output means for supplying the sequence of bits;

deriving means for deriving the first control signal, including:

second control signal means for deriving from the read signal a second control signal that indicates the velocity of the read head relative to the marks; and first control signal means for producing the first control signal;

the reading means are for reading information from a disc-shaped record carrier;

the deriving means further include means for deriving a fourth control signal based on a rotation rate of the disc and a radial position of the read head, which fourth control signal depends on a nominal relative velocity of the read head with respect to the record carrier at the rotation rate and radial position; and the first control signal means are for producing the first control signal depending the fourth control signal.

* * * * *